Figure 1:
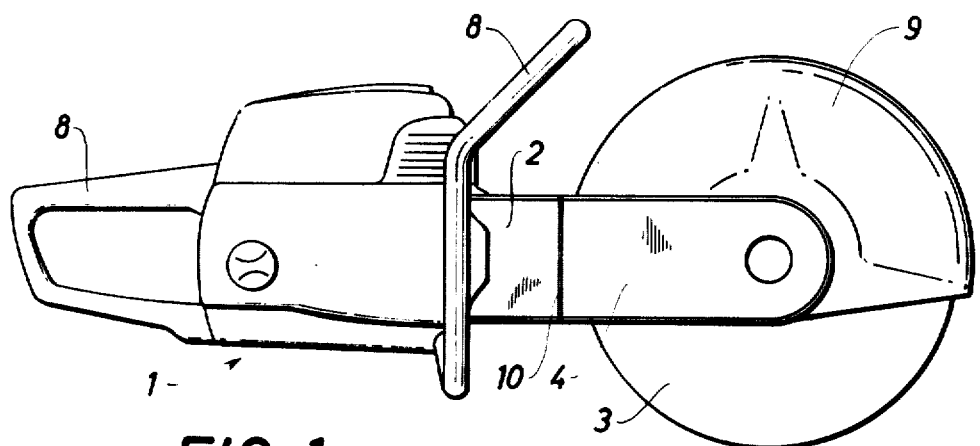

United States Patent [19]

Morner et al.

[11] 3,893,240

[45] July 8, 1975

[54] PORTABLE CUTTING-OFF IMPLEMENT

[76] Inventors: Bengt Morner, Ryetvagen 9, Hovas; Bengt Wallin, Hagmarksgatan 7, Goteborg, both of Sweden

[22] Filed: June 3, 1974

[21] Appl. No.: 476,072

[30] Foreign Application Priority Data
July 9, 1973 Sweden............................ 7309602

[52] U.S. Cl................................ 30/390; 51/170 PT
[51] Int. Cl.......................... B26d 1/14; B24b 23/02
[58] Field of Search.......... 51/170 PT; 30/388, 390, 30/166

[56] References Cited
UNITED STATES PATENTS
3,513,888   5/1970   Townsend............................ 30/390
3,583,106   6/1971   Dobbertin...................... 51/170 PT
3,735,489   5/1973   Zatorsky.............................. 30/390

Primary Examiner—Al Lawrence Smith
Assistant Examiner—J. C. Peters
Attorney, Agent, or Firm—Ulle C. Linton

[57] ABSTRACT

A portable cutting implement having a motor housing with a two-part arm whose outer end portion carries a cutting disc and can be turned and held in two different positions and a belt transmission extending through said arm and operatively connecting the motor to the cutting disc.

4 Claims, 10 Drawing Figures

PATENTED JUL _ 8 1975 3,893,240
SHEET 2
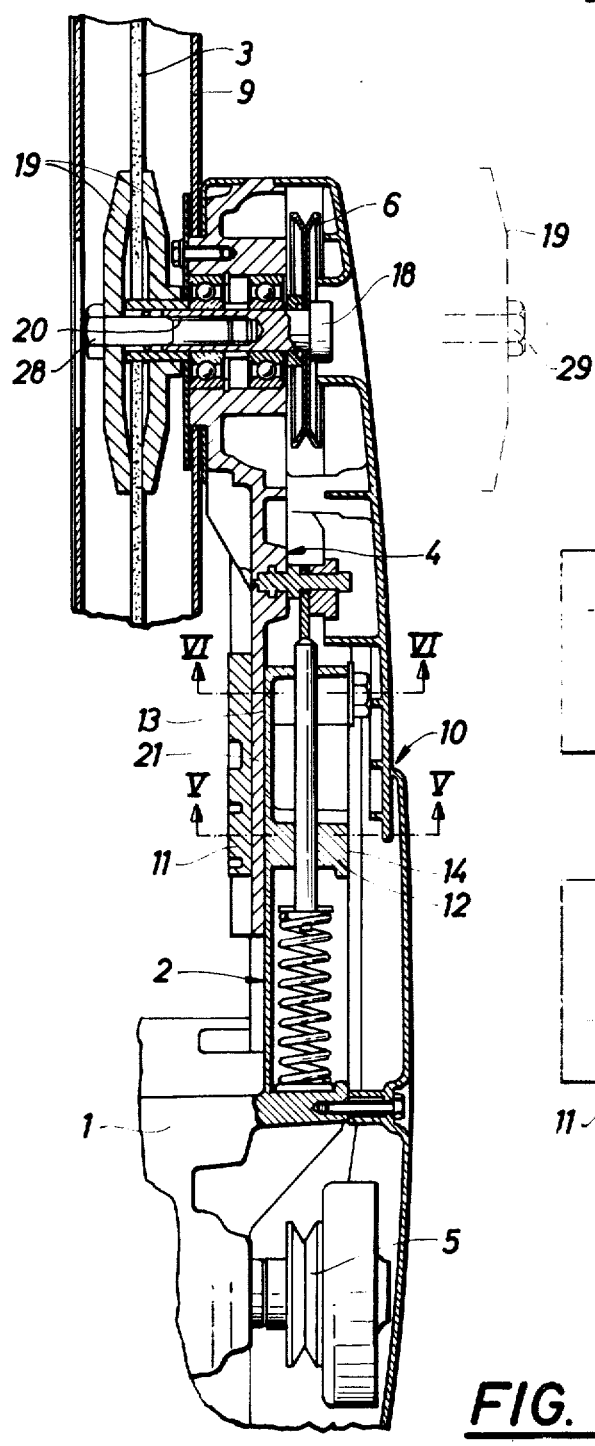
FIG. 4
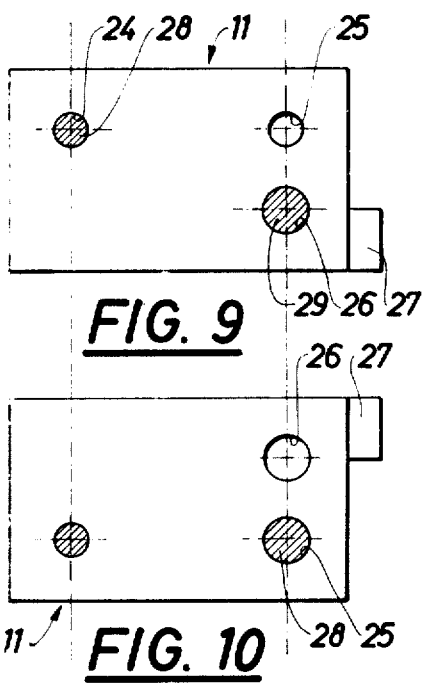
FIG. 9
FIG. 10

PORTABLE CUTTING-OFF IMPLEMENT

The present invention relates to a portable cutting-off implement having a motor driven cutting disc.

Cutting-off implements of this kind are known by way of example by the Swedish patent specification No. 212 948. In order to obtain a good balance in connection with their handling such implements have been designed with the cutting-off disc located in or near the longitudinal line of gravity of the implement. However, this means that the motor body projects at both sides outside of the plane of the cutting-off disc, which impedes cutting work near to a wall or similar. It has been proposed to surmount this obstacle by designing the shaft of the cutting-off disc in such a manner that the cutting-off disc can be attached to the same at both ends. However, this design involves considerable complication and increase in the cost of the construction.

It has also been proposed to design the arm, which is attached to the motor housing and at its outer end supports the cutting-off disc, in such a way that the holding flanges for the cutting-off disc located at the side of the arm can be positioned either on the inside of the arm towards the center of the motor unit or on the outside of said arm. However, such holding flanges are attached by means of a central screw which, according to the stipulations for the protection of workmen, shall tend to be turned in the tightening direction, if the cutting-off disc should slip. In the two mounting positions of the shaft the cutting-off disc, however, will be given two different directions of rotation by the driving motor, which only works in one direction, so that if the fastening screw or possibly the nut is arranged for tightening in one turning position, it will tend to unscrew in the other turning position.

It is an object of the invention to provide a cutting-off disc implement permitting a quick and easy switch-over of the cutting-off relative to the motor-body by the turning of the carrying arm, the advantage of the invention being obtained that in spite of this turning and of the unchanged direction of rotation of the motor the tightening action by the threaded element of attachment of the cutting-off disc always will be obtained from the driving torque of the shaft independently of the mounting position.

The object of the invention is reached by designing the device with the characteristics specified in the first claim.

Figure 2:
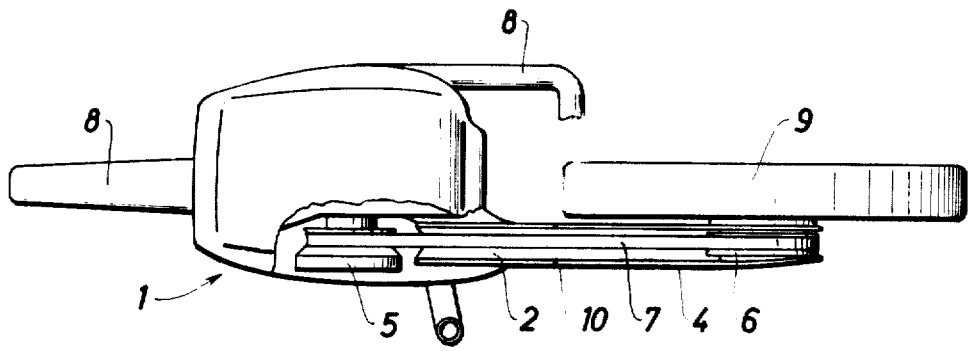
Figure 3:
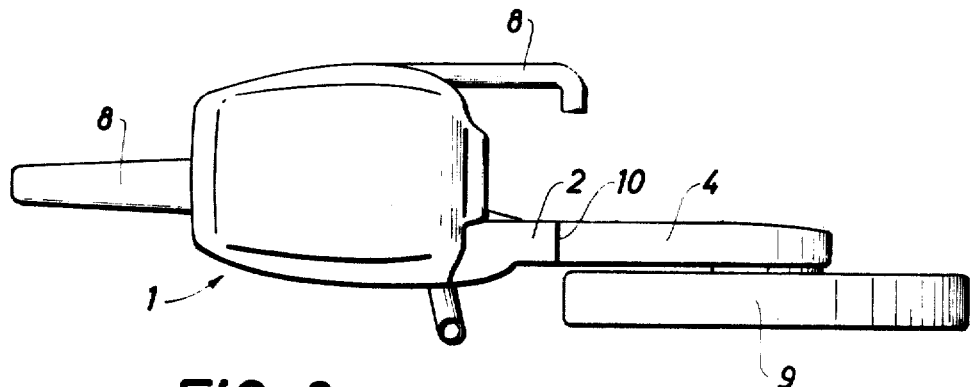
Figure 5:
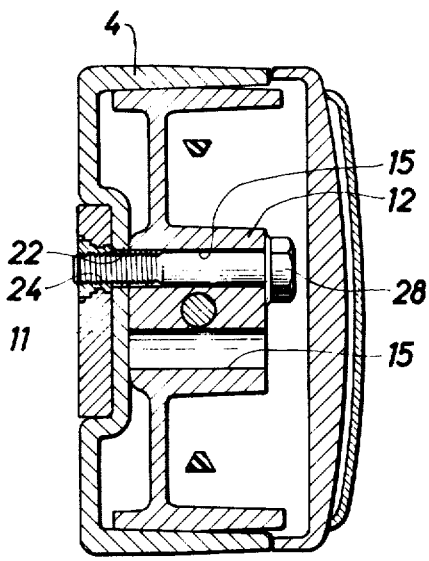
Figure 6:
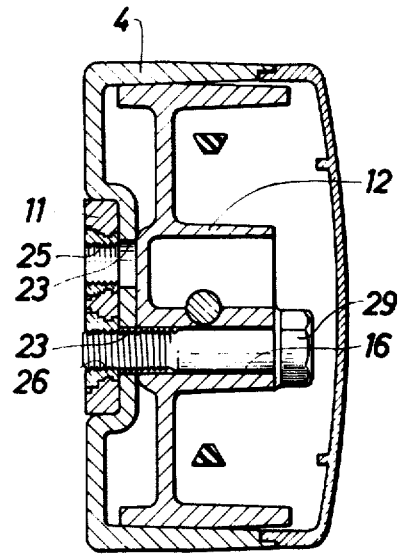
Figure 7:
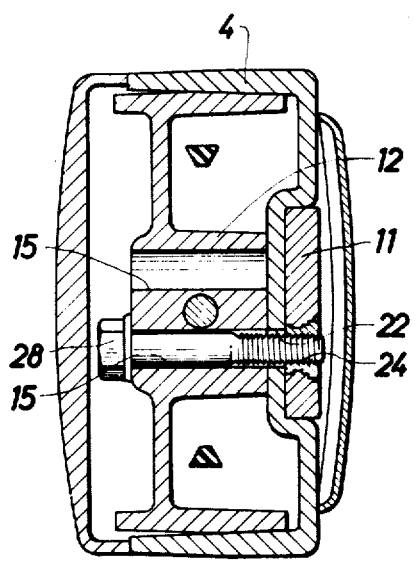
Figure 8:
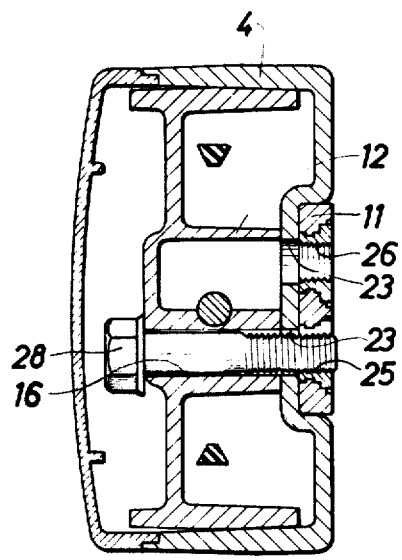

An embodiment of the invention will now be described more in detail in the following with reference to the accompanying drawings, in which FIG. 1 is a schematical side elevational view of a cutting-off implement of the kind to which the present invention refers, FIG. 2 is a top view partly broken away of the implement of FIG. 1, the cutting-off disc illustrated in one of its working positions, FIG. 3 is a top view of the same implement with the cutting-off disc in its other working position, FIG. 4 is a longitudinal cross sectional view through the cutting-off arm with a holding device for the cutting-off disc, FIGS. 5 and 6 illustrate cross sections through the cutting-off arm along the line V—V and VI—VI respectively with the cutting-off disc mounted in one of its working positions, FIGS. 7 and 8 respectively illustrate the same cross sections as FIGS. 5 and 6 but with the cutting-off disc mounted in its other working position, and FIGS. 9 and 10 finally illustrate a detail in the two turning positions determined by the mounting position of the cutting-off disc.

In the example of embodiment illustrated in the drawings the body 1 of the driving motor of the implement is indicated in the FIG. 1. The motor-body 1 comprises the motor intended for the drive of the implement and it has a two part arm 2, 4, one part 2 of which constitutes a part of the motor-body with an outwards extending position and at its free end of its outer portion 4 supports a bearing for a shaft of a rotable cutting-off disc 3 with a protective cover 9. As is evident from the partly fragmentary view in FIG. 2, a belt transmission from the motor shaft is arranged for the drive of the cutting-off disc 3, said belt transmission comprising a pulley 5 mounted on the motor shaft, a pulley 6 mounted on the shaft of the cutting-off disc, and a belt 7 laid over said pulleys. For the handling of the implement, there is a handle 8 arranged in conventional manner on the motor-body 1. The arm part 2 passes to the outer armpart 4 at the schematically illustrated joint indicated at 10.

In the longitudinal cross section through the cutting-off arm illustrated in FIG. 4 part of the details indicated and described above in connection with the FIGS. 1-3 are illustrated and they are given the same reference indications.

As mentioned, the arm at the point of junction 10 is split in the parts 2 and 4, and the part 2 attached to the motor-body 1 has an outer bracket 12 with two planes 13 and 14 and two holes 15 as shown in FIG. 5 and one hole 16 as shown on FIG. 6 line. The outer part 4 of the arm supports a shaft 18 for the cutting-off disc 3 and the pulley 6 for the drive of the same. In order to hold the cutting-off disc 3, there are two flanges 19 provided on the shaft 18, which flanges can be pressed against the cutting-off disc 3 by means of a threaded screw 28 introduced into a hole 20. The hole 20 is provided with right hand as well as left hand threads, which has proved to be practicable. In order to attach the part 4 of the arm to the inner part 2, a portion 21 with plane sides is provided in the arm part 4, which for the rest is designed with a modified U-profile. The portion 21 has holes, one hole 22 as shown in FIG. 5 and two holes 23 as shown in FIG. 6 and said holes in concordant position with the holes 15, 16 of the portion 12 of the arm part 2.

The detail illustrated in the FIGS. 9, 10, viz. a bracket 11 (also see FIGS. 4–8) also has holes in concordant position with the earlier mentioned holes, viz. in the cross sectional line V—V (mounted position) a hole 24 preferably with right hand thread, and in the cross sectional line VI—VI a hole 25 with right hand thread, and a hole 26 with left hand thread. As is shown as an example in the schematic illustration in the FIGS. 9, 10 of the bracket 11, said bracket is provided with shaped portions 27, which give it a definite position relative to the arm part 4. The bracket 11 is intended to lie against the portion 21 of the arm part 4, as is evident from the FIGS. 4–8.

In order to connect the two arm parts 2, 4 and to clamp the cutting-off disc 3 by means of the flanges 19, in all two screws 28 with right hand thread and one screw 29 with left hand thread are used. One of the screws 28 with right hand thread has previously been mentioned in connection with the mounting of the cutting-off disc 3.

In operation the part of the periphery of the cutting-off disc 3, which is intended to be facing the observer of the FIGS. 2, 3 and 4, is moving in outside direction away from the motorhousing 1, which corresponds to a clockwise rotation in FIG. 1. In order to secure that the screw in the hole of the shaft 18 shall tighten in case of a possible slip of the cutting-off disc 3, said screw shall be made with a right hand thread in connection with the mounting of the arm part 4 in the position, which corresponds the first working position of the cutting-off disc. This position is illustrated in FIGS. 1, 2, 4, 6, 9 and with continuous lines in FIG. 4. As is especially evident from the cross sections V—V and VI—VI, a hole 24 with right hand thread and a hole 26 with left hand thread in the bracket 11 in this position are accessible for fitting of screws, and when the corresponding screws have been fitted there remains of the whole set of screws, two screws 28 and one screw 29, only one screw 28, thus one with right hand thread, to be fitted into the hole 20 for the purpose of clamping of the two flanges 19. In the second position of the cutting-off disc and consequently also of the arm part 4 (illustrated in the FIGS. 3, 7, 8, 10 and in part with dashed and dotted lines in FIG. 4) in which the arm part 4 not only is transferred from the surface 13 to the surface 14 of the portion 12 but also is turned with its pre-existant underside upwards in order to permit it to be fitted in the desired position, the bracket 11 will be in such a position relative to the holes 15, 16 of the portion 12, that only the two holes 24, 25 with right hand thread will be accessible for fitting in the screws. Consequently, after attaching the arm part, only one screw 29 with left hand thread will remain for the clamping of the flanges 19 by tightening of the screw in the hole 20, in which because of the double threads both right hand and left hand threaded screws can be used. In said second position a screw with left hand thread is suitable for the resulting direction of rotation.

As is indicated in the drawings, it is not necessary that the two alternating right hand and left hand threaded screws form part of the whole series of fastening screws for the arm, but, as is shown in the cross section, only one screw can be of different dimension and the direction of its thread is then of no importance. it is of course not necessary to use a screw as fitting element for the cutting-off disc, a nut also may serve the same purpose, in which case the end of the shaft of the cutting-off disc is designed with both a right hand and a left hand thread, while the nuts are alternated in a manner, which corresponds the manner described for the screws.

We claim:

1. Portable cutting-off implement with a body (1), which comprises a driving motor and from which an arm (2, 4) extends, of which the outer end is provided with a shaft means (18) arranged to be driven by the rotation from the driving motor, said shaft being provided with a clamping device (19) with threaded connecting means (20, 28) for a cutting-off tool (3), said arm having brackets (11–27) designed to permit their mounting to be made at least in two working positions opposed to each other relative to the motor body (1), while the driving motor is assumed to work in the same direction of rotation in both working positions, the threaded connecting means comprising one or more parts (20) fitted to the shaft means (18) and one or more relative thereto removable parts (28), CHARACTERIZED BY the parts (20) of the threaded connecting means provided on the shaft means (18) being designed with threads for right hand as well as left hand thread and by the remaining part of parts (28, 29) exhibiting elements with either right hand thread or left hand thread, arranged to be alternated in such a manner that the operative thread is a right hand thread of a left hand thread according to the direction of rotation exhibited by the cutting-off tool (3) in its different working positions, by means of which arrangement a tightening of the threaded connecting means is obtained in case of a possible slip of the cutting-off tool (3) relative to the shaft means (18) independently of the direction of rotation determined by the working position.

2. Portable cutting-off implement according to claim 1, characterized by the brackets (11–27) exhibiting positions of fixation (24–26) for the removable parts (28, 29) of the threaded connecting means (20, 28, 29) of the shaft means (18), which positions are arranged in such a manner that in each working position a possibility of attachment is obtained only for those parts (28–29), which with respect to the direction of rotation in the specific working positions are not intended to be utilized at the movement in the threaded connecting means (20, 28, 29) of the shaft means (18).

3. Portable cutting-off implement according to claim 2, characterized by the brackets (11–27) exhibiting a threaded connecting means, in which said alternating parts (28, 29) are embodied.

4. Portable cutting-off implement according to claim 3 characterized by the shaft means (18) for its functional share in the threaded connecting means exhibiting a right hand and lefthand threaded hole (20) and by the second part of the threaded connecting means comprising two alternating right hand threaded and left hand threaded screws (28), 29) respectively, and by the brackets (11–27) exhibiting two bodies (11, 21, 12), one of which being connected with the shaft means (18), while the other one is connected with the motor body (1), one of the bodies (11) exhibiting a number of threaded holes (24–26), of which at least one (26) exhibits a differing direction of thread, while the other body (12) exhibits a number of free holes (15) corresponding the threads, the number of which free holes being less than the threaded holes (24, 26), said free holes (15) being positioned in such a manner that in the different working positions they will give access to the threaded holes (24–26) permitting a screw (28/29) for the shaft means (18) with a direction of thread suitable for the direction of rotation started to be set free by its corresponding threaded hole (25/26) being covered by the body (12) provided with free holes (15).

* * * * *